July 15, 1958 B. I. LEEFER 2,843,077
APPARATUS FOR INDICATING THE CONDITION OF FILTERS
Filed May 3, 1956 3 Sheets-Sheet 1
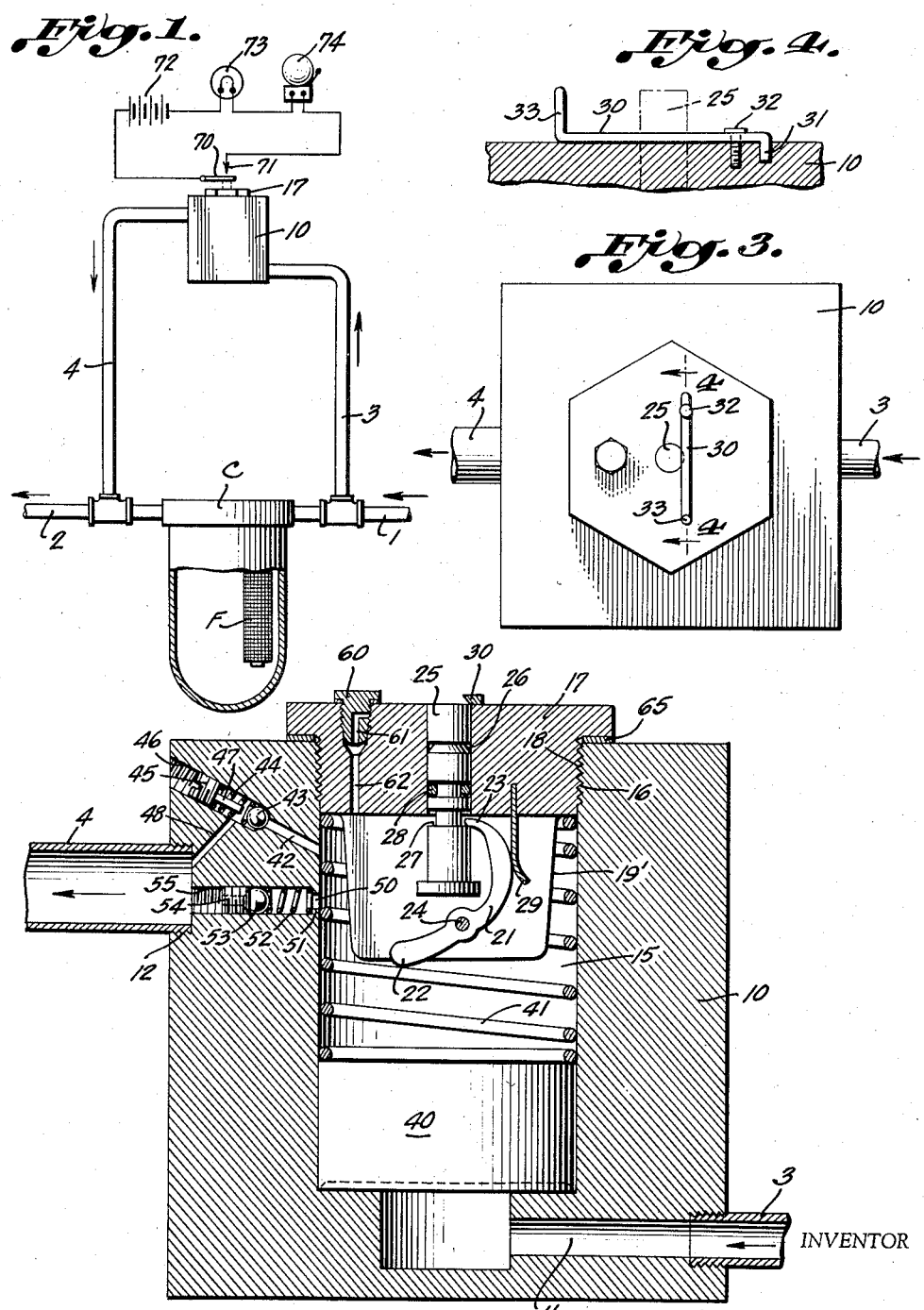
INVENTOR
BERNARD I. LEEFER
BY
ATTORNEY July 15, 1958  B. I. LEEFER  2,843,077
APPARATUS FOR INDICATING THE CONDITION OF FILTERS
Filed May 3, 1956  3 Sheets-Sheet 2
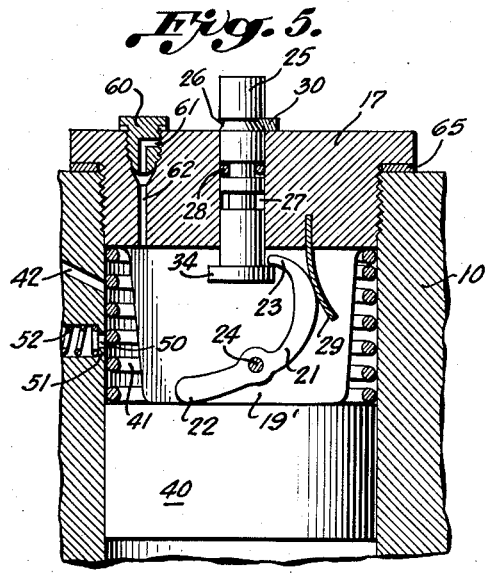
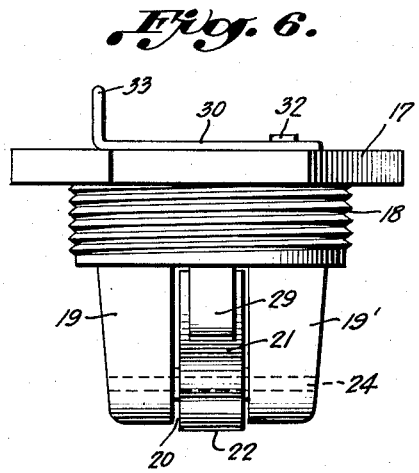
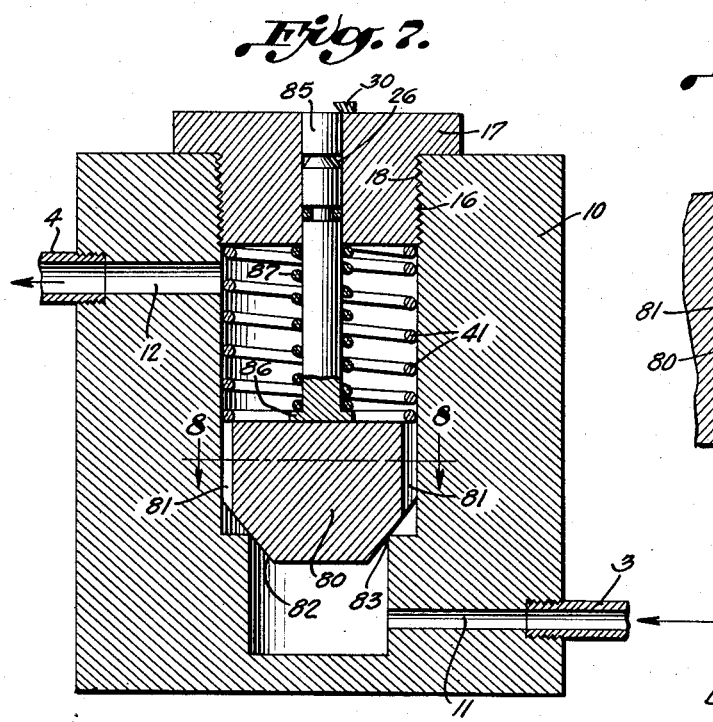
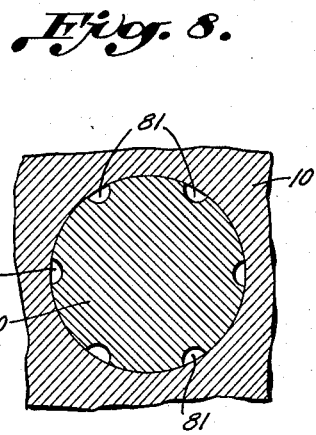
INVENTOR
BERNARD I. LEEFER
BY
ATTORNEY July 15, 1958
B. I. LEEFER
2,843,077
APPARATUS FOR INDICATING THE CONDITION OF FILTERS
Filed May 3, 1956
3 Sheets-Sheet 3
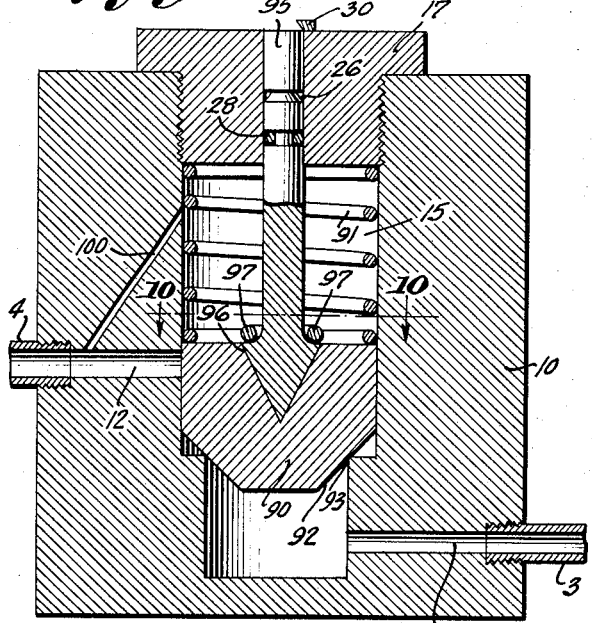
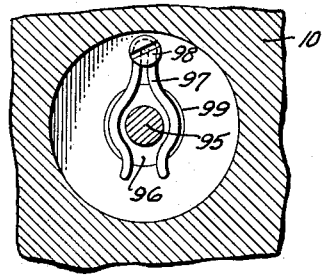
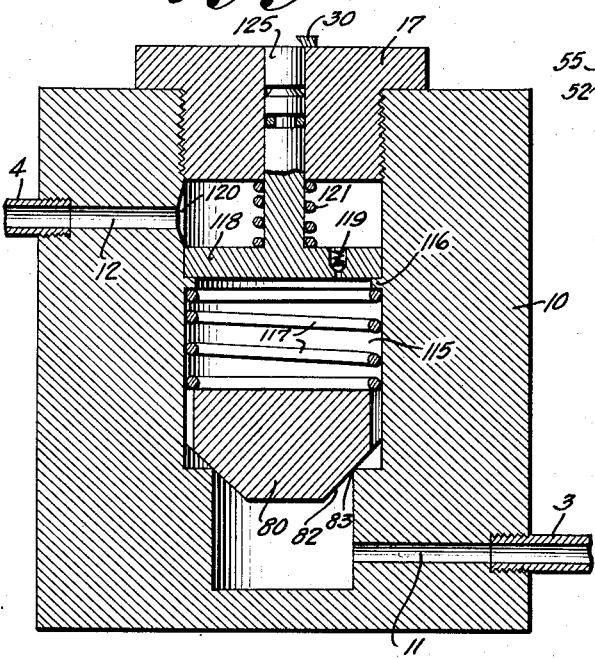
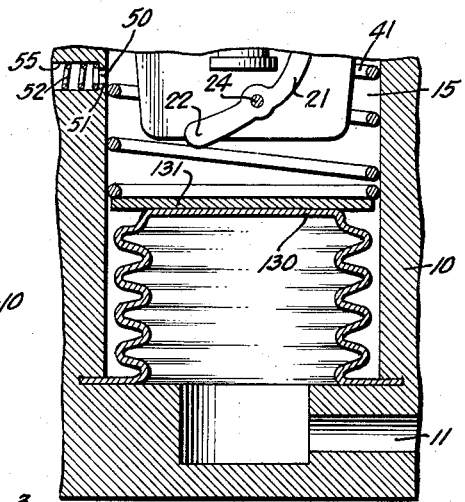
INVENTOR
BERNARD I. LEEFER
BY
ATTORNEY United States Patent Office 2,843,077
Patented July 15, 1958

2,843,077

APPARATUS FOR INDICATING THE CONDITION OF FILTERS

Bernard I. Leefer, Silver Spring, Md.

Application May 3, 1956, Serial No. 582,407

17 Claims. (Cl. 116—117)

This invention relates to an apparatus for testing the condition of filters in hydraulic systems.

It is the object of the present invention to provide a reliable indicator for the functional condition of filter elements in hydraulic systems in order to determine when a filter unit has become unduly clogged and requires cleaning or replacement.

It is another object of the invention to provide a testing arrangement for a liquid filter in a hydraulic system, which is a part of the permanent installation and which is constantly operative in situ to indicate the "good" and "no-good" condition of the filter, without need for removal of the filter for performing the test, for making any other connections or adjustments in the system, or for the installation of a single differential gauge or multiple pressure gauges at critical locations in the system requiring repeated readings and skilled interpretation thereof.

It is another object of the invention to provide a testing device which may be incorporated in a hydraulic system or in a filter in supplement to a pressure relief valve which may be employed in the system or filter, or which may constitute part of such relief valve to give a visible or audible indication of the possible faulty condition of the filter. The indication may be arranged to persist even if the fault giving rise to it disappears temporarily, so that the filter may be inspected for possible replacement.

It is another object of the invention to provide a testing apparatus which is rugged and reliable in operation and which is more economical than the testing devices known heretofore for the performance of such tests, requiring complex instruments and skilled personnel for their execution.

The invention proceeds upon the principle of providing a pressure chamber indicating device which is operated in response to a predetermined clogged condition of the filter element. Such a condition results in a large pressure differential on the opposite sides of the filter, and this critical pressure differential is utilized for the actuation of the indicator device which indicates the need for replacement of the filter unit. In the preferred embodiments of the invention, a time-delay is imposed on the operation of the indicator device in order to prevent its operation by momentary excessive pressures resulting from hydraulic shock or external mechanical impulses, or other causes bearing no relation to the pressure difference caused by a clogged condition of the filter. The indicator device is preferably latched in its indicating position, which requires manual re-setting after due notice is taken thereof.

Other objects and purposes will appear from the detailed description of the invention following hereinafter, taken in conjunction with the accompanying drawings, wherein Fig. 1 is a schematic diagram illustrating the permanent location of the testing device across the filter element in a hydraulic system for the purpose of giving a visible or audible signal when a predetermined pressure differential develops across the opposite sides of the filter;

Fig. 2 is a vertical sectional view of the preferred embodiment of the hydraulic pressure chamber embodying an indicator element for indicating the "good" and "no-good" condition of a filter unit;

Fig. 3 is a plan view of Fig. 2;

Fig. 4 is a vertical sectional view along line 4—4 of Fig. 3;

Fig. 5 is a vertical sectional view of the upper portion of Fig. 2 showing the parts in indicating position;

Fig. 6 is a right end view of the closure plug for the pressure chamber;

Fig. 7 is a vertical sectional view of a simplified embodiment of a testing apparatus embodying an indicator rod;

Fig. 8 is a horizontal sectional view along line 8—8 of Fig. 7;

Fig. 9 is a vertical sectional view of a third embodiment of a pressure chamber with indicator rod assembly therein;

Fig. 10 is a horizontal sectional view along line 10—10 of Fig. 9;

Fig. 11 is a vertical sectional view of another embodiment of the invention; and Fig. 12 is a vertical sectional view of a portion of the pressure chamber shown in Fig. 2 with a modified form of operating piston therein.

In Fig. 1 of the drawings is shown a filter unit F disposed in a casing C through which is adapted to traverse a liquid medium through the course of its passage from conduit 1 to conduit 2, which medium contains foreign matter which is desired to be filtered therefrom and trapped by the filter F. Usually no means is provided for indicating whether or not the filter is clogged. The use of a filter for a predetermined number of hours is an unsatisfactory criterion of adequacy of the filter, particularly in the case when the character of the liquid medium being filtered is subject to wide fluctuation. Therefore the periodic replacement of a filter is either uneconomical or dangerous. The testing of the condition of the filter by means of pressure gauges inserted in the upstream and downstream sides of the filter is a costly procedure and requires skilled personnel for the purpose of properly interpreting the results.

The present invention serves to provide a simple and economical indicator which is disposed in the system permanently and which tests in situ the condition of the filter so that when the same becomes clogged to an objectionable degree the resulting pressure differential on the upstream and downstream sides of the filter actuates the signal device to indicate that a filter-unit replacement is in order.

The testing device in accordance with the invention is indicated in Fig. 1 by housing 10, which is disposed in parallel to the filter unit F by means of conduits 3 and 4 leading to the inlet and outlet, respectively, of the test housing. A normally concealed indicator rod 25 is adapted to be projected from the housing 10 upon the incidence of a predetermined pressure differential across the opposite sides of the filter unit, and, as explained below, this indicator rod may be employed to actuate a visible or audible signal at some remote point to signal the need for a filter replacement.

The structural details of one preferred embodiment of the testing apparatus are shown in Figs. 1 to 6, and include the test housing 10 having the inlet channel 11 at the base thereof, and outlet channel 12 near the top thereof, connected, respectively, to the inlet conduit 3 and outlet conduit 4 which shunt the filter unit F. A cylindrical pressure chamber 15 is formed on the interior of the housing 10 and is internally threaded at 16 at the upper end thereof for the purpose of receiving a closure plug 17 thereon having external threads 18 for cooperation with the threads 16. A piston 40 rests at the bottom of the pressure chamber and may be superposed by a coiled spring 41 which resiliently forces the piston 40 onto its seat in the normal operation of the hydraulic system. The rest of the pressure chamber 15 is filled with liquid, and a threaded vent plug 60, having an air relief passage 61, is disposed in the closure plug 17 to assure the complete elimination of air from the chamber through passage 62 in the vent plug so that the hydraulic system may be in readiness for operation upon the occurrence of a predetermined differential in pressure in conduits 3 and 4, which may be occasioned by an objectionable clogged condition of the filter F.

The lower face of the closure plug 17, at its periphery, serves to seat the upper end of the coiled spring 41, which acts to keep the piston 40 in place. The center part of the closure plug (Fig. 6), is bifurcated to form a pair of lugs 19, 19' having a gap or space 20 therebetween in which is accommodated at latch 21 which is pivoted on pin 24 extending through the bifurcated projections 19, 19' with one end of the latch 22 projecting beyond the lower boundary of the lugs 19, 19' while the upper end of the latch 23 engages an annular slot 27 in the cylindrical indicator rod 25 fitting closely within the closure plug. A spring 29, seated within the body of the closure plug 17 and disposed within the gap 20, serves to press the pawl end 23 of the lever 21 into the slot 27 until such time as the upward movement of the piston 40 rocks the lever 21 clockwise by striking against the end 22 to positively withdraw the end 23 from the groove 27. Thereupon, the high pressure acting on the bottom face of the indicator rod 25 serves to force the same upwardly, and following a predetermined travel of the rod, it is latched in its raised position by the springing of detent 30 on the upper face of the closure plug into the V-shaped notch 26 near the upper end of the indicator rod.

As shown in Figs. 3, 4 and 6, the spring detent or retainer 30 has one end 31 thereof seated in the top of the closure plug 17 and is fixed in that position by means of bolt 32. The spring 30 is biased to overlie slightly the indicator rod, which in its upward movement cams or flexes the same from its set position until notch 26 comes into the path of the spring 30, at which time the latter springs into the notch and latches the indicator in place. The same may be unlatched for the purpose of re-setting the indicator rod 25 by flexing the spring 30 around its fixed end 31 in a counterclockwise direction, which may be done conveniently by grasping the upwardly extending free end 33 (Fig. 4).

In Fig. 5 is shown the indicator rod in actuated position for indicating a large pressure difference between the inlet and outlet of the housing and which has forced the piston 40 into contact with the free end 22 of the latch 21, resulting in the upward movement of the indicator rod 25, and in which position it is latched by means of spring 30 and at which time the pawl end 23 of the lever 21 yieldingly engages the shoulder 34 at the bottom of the indicator rod 25.

In order to seal the liquid medium in the test housing tightly, gasket 65 is provided between the test housing 10 and closure plug 17, and an annular sealing ring or gland 28 may be fitted in a groove of indicator rod 25. A sealing gasket may also be applied to the venting plug 60 to assure a tight closure at this point of the assembly.

As mentioned above, the projection of indicator rod 25 from the closure plug 17 indicates the need for a new filter element F and sometimes it is desirable that this warning be given more positively than by mere visual inspection of the top of the test housing 10. Therefore, as indicated in Fig. 1, the movement of the indicator rod 25 may operate a switch arm 70 to complete a circuit at contact 71, which may include a source of energy such as a battery 72, a warning light 73 and/or an audible alarm bell 74.

In order to prevent the indicator rod from operating in response to momentary excessive pressures, resulting from transient hydraulic shocks or external mechanical impulses, a time delay mechanism may be incorporated in the test housing to effect the release of the indicator rod only upon the occurrence of a sustained pressure differential. This mechanism consists of a restricted passage 42 at the upper end of the pressure chamber upon which is seated a ball valve 43 pressed against the seat of passage 42 by means of spring 44, the force of which may be adjusted by the externally threaded screw plug 45 fitting within the threaded bore 46 communicating with passage 42. The screw plug 45 is additionally provided with a projecting pin 47 which limits the degree of unseating of the ball valve 43 from its seat.

Another restrictive passage 48 extends between the outlet 12 in the housing and the outlet end of the check valve 43.

A refill check valve 53 is provided in another bore 55 of the housing, between the pressure chamber and the outlet 12. This refill check valve is closed lightly by spring 52, which has one end seated against shoulder 51 of passage 50 opening into the pressure chamber and the opposite end pressing on the ball valve 53 which seats against externally threaded and internally bored valve seat 54.

The plug 45, which may be adjusted externally by means of a screw driver, serves to control the pressure differential at which the indicator becomes operative. Preferably, the spring 44 is compressed to a degree below the setting of any relief valve which may be used in conjunction with the filter, so that at some pressure differential below that which would operate the conventional full flow relief valve which may be part of the system, the travel of piston 40 in an upward direction causes the liquid medium in the pressure chamber to pass slowly therefrom, passing ball valve 43 and restricted passage 48 to the outlet conduit 4. If this high pressure differential condition is transitory in nature, resulting in a return of piston 40 by means of spring 41, the liquid in the pressure chamber is refilled by the passage of liquid thereinto through check valve 53 which is under much less force than is check valve 43. The passages 42 and 48 are of restricted cross-section in order that the travel of the liquid from the pressure chamber, and consequently the movement of piston 40 is slowed down, in order to permit its return before striking lever 22 if the high pressure condition is a transient one. Only if the pressure differential is one of a sustained character does the piston 40 travel to its upper limit as indicated in Fig. 5 to actuate the indicating rod to its operative position.

In Figs. 7 and 8 is illustrated a simpler embodiment of the invention which may find utility in less costly installations than is warranted by the testing apparatus shown in Figs. 2 to 6. In this, as well as in the embodiments described hereinafter, corresponding parts are designated by the same reference characters as those described above. This unit, as well as the other units described herein may be interposed in conduits 3 and 4 or may as well form part of the filter casing C.

As shown in Figs. 7 and 8, the closure plug 17 for the pressure chamber 15 may be provided with a venting plug as well as with sealing gaskets, or it may be more simply designed by permitting the venting of the air therefrom incidental to the application of the closure plug to the housing. Thus, the venting of the air from the pressure chamber takes place at the threads 16 and 18 when the chamber is filled and the closure plug is applied thereto.

A piston 80 of special design, resembling a poppet relief valve, having a tapered or frusto-conical end 82 cooperating with a seat 83 of the housing, is resiliently maintained in seated position at the inlet 11 by means of coiled spring 41 disposed adjacent to the outlet 12 in the housing and acting between the underface of the closure plug 17 and the top of the piston. The cylindrical indicator bar 85 extends to the upper face of the poppet valve and is flanged thereat to provide an abutment 86 for a restoring spring 87 for the indicator rod. Any pressure differentials between the inlet tube 3 and the outlet tube 4 will cause an upward travel of the piston 80, the action of which will be decelerated by the provision of the longitudinal grooves 81 in the lateral wall of the piston 80. So long as these differential pressures are transitory, the spring 41 will return the piston to its seated position and the spring 87 will return the indicator bar 85 to the position shown in Fig. 7, that is, until such time as the upward travel of the indicator bar 85 brings the notch 26 therein in position for latching by the spring detent 30. When this occurs, it is necessary to manually reset the indicator bar so that it may assume again the position shown in Fig. 7. If the condition of high pressure differential is a persistent one, the indicator bar immediately springs to its indicating position which is indicative of a sustained pressure difference which may be the result of a clogged filter element which requires replacement or cleaning.

In the embodiments shown in Figs. 9 and 10, the piston 90 is provided with a frusto-conical end 92 for cooperation with the seat 93 in the housing. The coiled spring 91 serves to resiliently force the piston 90 against the seat 93. While the piston in this embodiment has no grooves in the lateral wall thereof, a relief passage 100 is provided in the housing between the upper end of the pressure chamber 15 and the outlet 12 therein to decelerate the upward travel of the piston.

The indicator rod 95 in this embodiment is provided with a conical end 96 which fits within a correspondingly shaped recess in the top of piston 90. The parts are interconnected by means of a bifurcated spring clip 97 having the apex affixed to the top of the piston by means of bolts 98 and which has the arms 97 embracing the top curved seat of the conical end 96 of the indicator rod 95. High pressure differentials cause the conjoint movement of the piston 90 and the indicator rod 95 and upon a predetermined travel of the piston and indicator rod the detent latch 30 engages within notch 26. Should the initiating pressure difference be eliminated, the spring 91 may return the piston 90 to its seated position despite the latched condition of the indicator rod 95, at which time the arms 97 of the spring clip may be spread beyond the peripheral boundary 99 of the indicator rod to become released from that portion of the indicator rod which is illustrated in Fig. 9. Despite the separation between the indicator rod 95 and the piston 90, resulting from this mode of operation, the indicator rod may be reset by manually springing detent latch 30 from notch 26, and the downward movement of the indicator rod 95 will result in a camming apart of the bifurcated arms 97 as the maximum diameter of the rod passes the clip into the position of the parts shown in Fig. 9, when the indicating rod and piston become interconnected by means of the clip 97.

A fourth embodiment of the invention is illustrated in Fig. 11 in which the piston 80 resembles the grooved poppet valve shown in the embodiments of Figs. 7 and 8, having the tapered end 82 cooperating with seat 83 adjacent to the inlet 11 of the housing 10. The lower part of the pressure chamber 115 is bounded at its top by means of annular shoulder 116 against which is seated the upper end of the coiled spring 117 to force the piston 80 against its seat 83.

The indicator rod in this embodiment is formed as a piston 118 operating within the upper end of the pressure chamber 115 with the central indicating portion 125 extending from the closure plug 17. A coiled spring 121 surrounds the lower end of the indicator rod 125 and serves to maintain the piston 118 in contact with the annular shoulder 116. A spring check valve 119 is disposed within the piston 118 to control a capillary passage from the lower part of pressure chamber 115 to the upper part thereof as the piston 80 is forced upwardly, which, after a predetermined time delay, causes the upward movement of the piston 118 against the force of spring 121. The outlet 12 is flared at its junction with the pressure chamber so that the upward movement of piston 118 does not completely block the outlet passage. The check valve 119 and the passage 120 serve to introduce a time delay in the action of the indicating bar 125 in its upward travel until such time as it latched by spring detent 30 to indicate a clogged condition of the filter.

In Fig. 12 is shown a modified form of piston in a test housing as shown in Figs. 2 to 6. In this construction a Sylphon gland 130 communicates with the inlet 11 of the housing 10 to cause the upward travel of the diaphragm 131 in response to high pressure differentials, until such time as the diaphragm 131 rocks latching lever 21 from its locking position, as fully described in connection with the first embodiment. The diaphragm 131 and expansible bellows 130 are returned to normal position by means of coiled spring 41.

Any other forms of pressure transmitting chambers for actuating diaphragms may be used in lieu of the form illustrated in this figure or the pistons shown in the other embodiments.

The several embodiments of the invention illustrated in Figs. 9 to 11 may employ closure plugs 17 fitted with venting plugs as shown in detail in Fig. 2, or the venting may be accomplished incidental to the application of the closure plugs to the pressure chambers.

While I have described my invention as embodied in a specific form and as operating in a specific manner for the purpose of illustration, it should be understood that I do not limit my invention thereto, since various modifications will suggest themselves to those skilled in the art without departing from the spirit of my invention, the scope of which is set forth in the annexed claims.

I claim:

1. In an apparatus for testing the functional condition of a filter disposed in the channel of a liquid medium, a pressure responsive device shunting said filter in said channel comprising a pressure chamber having an inlet connected to said channel upon one side of said filter and an outlet connected to said channel upon the opposite side of said filter, a piston normally positioned on a seat in said chamber at said inlet and movable therein upon the incidence of a predetermined pressure differential at the inlet and outlet of said chamber, means in said chamber adjacent to said outlet therein adapted to yieldingly hold said piston against said seat, an indicator rod controlled by said piston in response to the movements imparted to said piston arising from said pressure differentials, and means for latching said indicator rod in signalling position following a predetermined travel thereof to signal a clogged condition of said filter.

2. In an apparatus for testing the functional condition of a filter disposed in the channel of a liquid medium, a pressure responsive device shunting said filter in said channel comprising a pressure chamber having an inlet connected to said channel upon one side of said filter and an outlet connected to said channel upon the opposite side of said filter, a vented filler plug for sealing said chamber, a piston having a tapered end normally positioned on a seat in said chamber at said inlet and movable therein upon the incidence of a predetermined pressure differential at the inlet and outlet of said chamber, a spring in said chamber adjacent to said outlet therein above said piston adapted to force said piston resiliently against said seat, an indicator rod controlled by said piston in response to the movements imparted to said piston arising from said pressure differentials, and means for signalling a predetermined travel of said indicator rod to signal a clogged condition of said filter.

3. An apparatus as set forth in claim 2 wherein said piston is formed with communicating passages between the inlet and outlet of said chamber.

4. An apparatus as set forth in claim 2 wherein a coiled spring surrounds said indicator rod to return said rod to its operative position so long as said rod remains in unlatched condition.

5. An apparatus as set forth in claim 2 provided with releasable coupling means between said piston and indicator rod to permit the return of said piston to its seating position while the indicating rod remains in its signalling position and the eventual manual coupling of said rod with said piston.

6. An apparatus as set forth in claim 5 wherein said releasable coupling means comprises a bifurcated spring clip affixed to the top of said piston with arms yieldingly engageable with the lower end of said indicator rod as the same experiences to-and-fro relative movements with respect to said piston.

7. An apparatus as set forth in claim 2 wherein a capillary passage extends between the outlet in said pressure chamber and the space therein between said piston and filler plug.

8. In an apparatus for testing the functional condition of a filter disposed in the channel of a liquid medium, a pressure responsive device shunting said filter in said channel comprising a pressure chamber having an inlet connected to said channel upon one side of said filter and an outlet connected to said channel upon the opposite side of said filter, means movable in said chamber upon the incidence of a predetermined pressure differential at the inlet and outlet of said chamber, an indicator device controlled by said means in response to a sustained period of said pressure differential which is indicative of a predetermined clogged condition of said filter, and auxiliary means operative on said first means to permit the return of said last-mentioned means to its normal position before the operation of said indicator device upon the incidence of temporary or transient pressure conditions.

9. In an apparatus for testing the functional condition of a filter disposed in the channel of a liquid medium, a pressure responsive device shunting said filter in said channel comprising a pressure chamber having an inlet connected to said channel upon one side of said filter and an outlet connected to said channel upon the opposite side of said filter, means movable in said chamber upon the incidence of a predetermined pressure differential at the inlet and outlet of said chamber, an indicator device controlled by said means in response to a sustained period of said pressure differential which is indicative of a predetermined clogged condition of said filter, and time delay means effective on said first means to permit the return of said last-mentioned means to its normal position upon the incidence of only transient pressure differentials at the inlet and outlet of said chamber.

10. An apparatus as set forth in claim 9 wherein said last-mentioned means comprises a restricted passage communicating with the outlet for delaying the movement of the first means within said pressure chamber.

11. In an apparatus for testing the functional condition of a filter disposed in the channel of a liquid medium, a pressure responsive device shunting said filter in said channel comprising a cylindrical pressure chamber having an inlet connected to said channel upon one side of said filter and an outlet connected to said channel upon the opposite side of said filter, a piston normally positioned on a seat in said chamber at said inlet and movable therein upon the incidence of a predetermined pressure differential at the inlet and outlet of said chamber, spring means in said chamber adjacent to said outlet therein adapted to yieldingly hold said piston against said seat, an indicator rod controlled by said piston in response to the movements imparted to said piston arising from said pressure differentials, means for latching said indicator rod in signalling position following a predetermined travel thereof to signal a clogged condition of said filter, and time-delay mechanism associated with said pressure chamber for delaying the movement of said indicator rod following the movement of said piston.

12. An apparatus as set forth in claim 11 wherein said last-mentioned mechanism comprises a restricted passage extending from said pressure chamber above said piston to said outlet, an adjustable relief valve within said passage, and a re-fill valve between said outlet and pressure chamber for re-filling said pressure chamber with liquid upon the return of the piston to its seat to make up for the liquid which had passed through said relief valve.

13. An apparatus as set forth in claim 12 wherein an externally threaded closure plug is provided for said pressure chamber, an annular seat on the underface of said plug for said spring means acting on said piston, a pair of spaced lugs inwardly of said annular seat for pivotally supporting a latching lever therebetween, said lever having a part thereof in the path of travel of said piston which is tripped thereby to release the indicator rod for signalling movement.

14. An apparatus as set forth in claim 13 wherein the piston is in the form of a collapsible bellows, and a diaphragm controlled thereby for tripping said latching lever.

15. An apparatus as set forth in claim 11 wherein said indicator rod terminates in an auxiliary piston movable in said pressure chamber above said spring means and in the field of said outlet, said outlet being flared at the junction of said pressure chamber therewith, and said last-mentioned time-delay mechanism comprises a restricted passage in said auxiliary piston for controlling the flow of liquid from the space below said auxiliary piston to the space thereabove and thereby to force said auxiliary piston and indicator rod to lag behind the movement of said piston.

16. An apparatus as set forth in claim 1, including a closure plug for said pressure chamber, and said last-mentioned latching means comprises a spring detent mounted on the top of said closure plug in the path of travel of said indicator rod, and a notch in said indicator rod for receiving said spring detent following a predetermined travel thereof.

17. An apparatus as set forth in claim 16 wherein said closure plug is fitted with a threaded venting plug having an air passage therein to ensure the complete filling of said pressure chamber with liquid without air entrapment.

References Cited in the file of this patent

UNITED STATES PATENTS

| 1,662,529 | McKinley | Mar. 13, 1928 |
| 2,137,495 | Kershaw | Nov. 22, 1938 |
| 2,386,412 | Wakefield | Oct. 9, 1945 |
| 2,691,893 | Meyer | Oct. 19, 1954 |

FOREIGN PATENTS

| 741,445 | Germany | Nov. 11, 1943 |